Nov. 24, 1953    T. P. CAMP ET AL    2,660,416
SELF-CLEANING GATE FOR MIXING MACHINES
Filed Dec. 14, 1948    4 Sheets-Sheet 1

INVENTORS.
Thomas P. Camp
John J. Thorson
& Joseph A. Besal.

Nov. 24, 1953  T. P. CAMP ET AL  2,660,416
SELF-CLEANING GATE FOR MIXING MACHINES
Filed Dec. 14, 1948  4 Sheets-Sheet 2

INVENTOR.
Thomas P. Camp.
John J. Thorson.
Joseph A. Besal.
By Thiess, Olson + Mecklenburger Getty Patented Nov. 24, 1953

2,660,416

UNITED STATES PATENT OFFICE 2,660,416

SELF-CLEANING GATE FOR MIXING MACHINES

Thomas P. Camp, Arlington Heights, Ill., John I. Thorsen, Philadelphia, Pa., and Joseph A. Besal, Chicago, Ill., assignors to United States Gypsum Company, Chicago, Ill., a corporation of Illinois Application December 14, 1948, Serial No. 65,242

25 Claims. (Cl. 259—178)

The present invention relates to an adjustable gate construction for a mixer, such as a centrifugal mixer intended for preparing a slurry of gypsum plaster or other cementitious materials, and has special reference to an adjustable, self-cleaning gate and spout construction therefor.

More particularly this invention relates to a self-cleaning gate construction for centrifugal mixers, one type of which is disclosed in Camp Patent No. 2,253,059, dated August 19, 1941. Such mixers include a disc rotated at relatively high speed with a housing thereabout. The mixer is provided with means for effecting thorough mixing of the gypsum plaster or other material with water, and, if desired, foam, by the time it reaches the peripheral discharge gates in the housing.

In prior art mixers it was extremely difficult, if not impossible, to adjust the discharge gates so as to control with any real accuracy, the rate of discharge of the material from the mixer. Moreover, the discharge constructions frequently became clogged or jammed due to the accumulation at various locations of the material being handled. It was therefore necessary to clean such constructions frequently, and often necessitated shutting down the mixer.

The present invention substantially overcomes these difficulties. The discharge gates may be easily and accurately adjusted. Furthermore, self-cleaning means are employed which act to keep the discharge constructions relatively free of the material being discharged, thereby permitting operation of the mixer over long periods of time without the necessity for stopping it to clean the discharge constructions thereof. Wherever possible, the surfaces contacted by the material being discharged are so shaped and positioned that the stream of material continuously sweeps the surfaces and maintains them clean. In addition, scrapers are utilized for continuously scraping certain surfaces upon which the material would ordinarily build up. This prevents sufficient build-up of material to form large lumps which, if removed without shutting down the mixer, would become mixed with the slurry and, if supplied to board forming machines, would cause defective boards, as often happened when prior art mixers were employed.

In the present discharge or gate construction an arcuate member corresponding to a segment of the peripheral wall surrounding the rotating disc is pivotally mounted at one end to act as a gate. A handle and levers are provided to effect easy and accurate adjustment thereof. A spout forming the receiving end of a discharge conduit is preferably mounted in a vertical position adjacent the free end of the gate, and an opening is provided in one side thereof to receive material discharged from the mixer when the gate or segment is in open position. The free end of the gate is provided with an outwardly extending arcuate portion shaped to close the spout opening when the gate is in closed position. It also serves to clean material from the sides of this opening when moved thereacross.

As the vertical edge of the spout opening nearest the mixing machine is subjected to considerable wear due to the impingement of the material thereagainst, a replaceable portion is provided which will withstand wear for long periods and may be readily replaced when required.

Means are provided in each spout for maintaining the interior thereof clean at all times. In one form this consists of an elongated scraper supported at its upper end by a member rotatably mounted in the upper end of the spout above the opening. The scraper is positioned so as to scrape the inner surface of the spout when the scraper disc is rotated. Moreover, the lower surface of the rotating member is so shaped and positioned that the slurry or material being discharged from the mixer into the spout continually sweeps across this face of the disc and maintains it clean.

An object of the present invention is to provide a self-cleaning gate construction for a mixing machine which will remain clean and unclogged after long periods of use.

An additional object is to provide a self-cleaning gate construction in which various parts are swept clean by the stream of material being discharged from the mixer.

Another object of this invention is to provide such a gate construction having a scraper arranged to continually scrape the walls of the discharge spout when the machine is in operation.

A further object is to provide a self-cleaning gate construction which may be readily removed from the mixer when desired.

A still further object is to provide a self-cleaning gate construction of the type above referred to which may be easily and accurately adjusted to control the rate of discharge of material from the mixer.

Still another object is to provide a discharge gate construction in which the side of the spout opening subjected to the greatest wear because of impingement of material thereagainst may be readily replaced.

Further objects and advantages will be apparent from the following description and claims when considered with the drawings in which—

Figure 1:
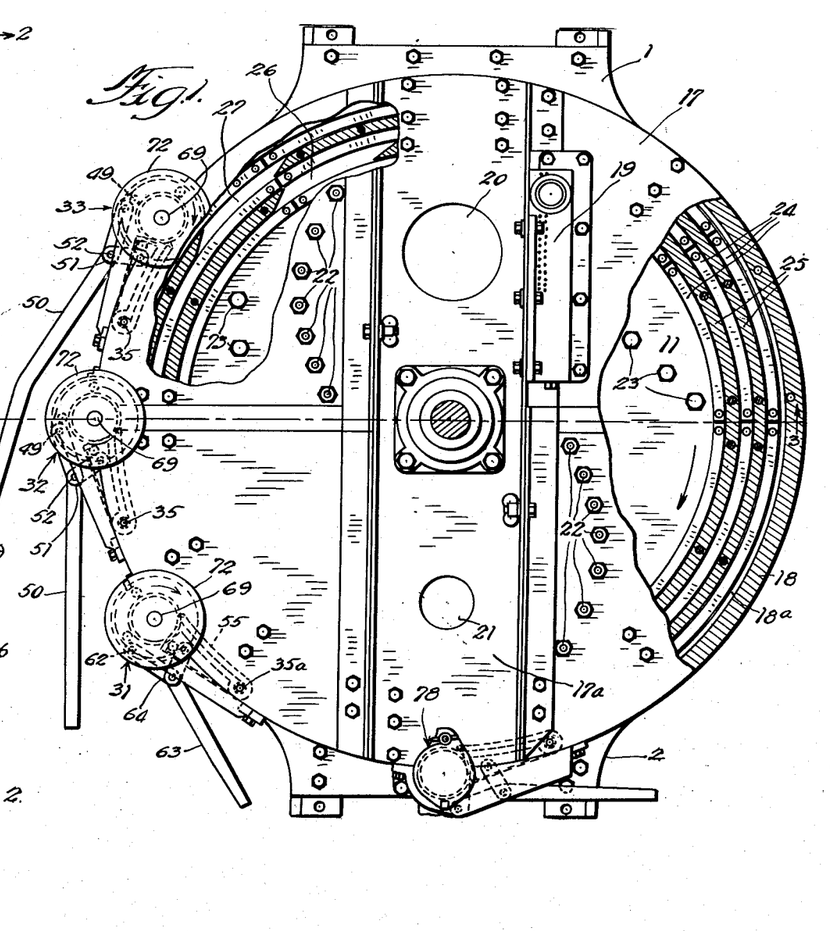
Fig. 1 is a plan view with certain portions broken away of a mixing machine having a plurality of self-cleaning gate constructions embodying the present invention.
Figure 2:
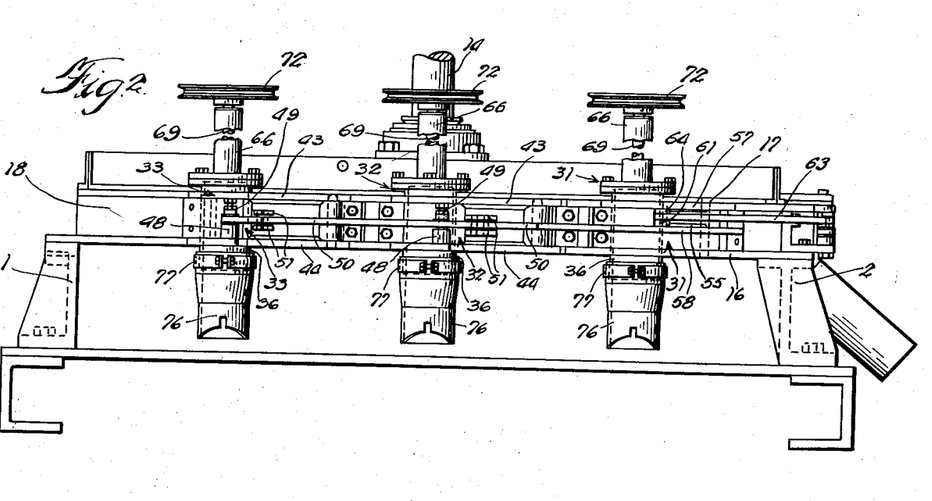
Fig. 2 is a side elevational view of the machine shown in Fig. 1, looking in the direction of the arrows 2—2 of Fig. 1.

Referring to the drawings, and more particularly to Fig. 1 thereof, there is shown a mixing machine having a plurality of self-cleaning discharge gate constructions embodying the present invention mounted on one side of the periphery thereof.

The mixer illustrated comprises a rotatable disc 11 of metal or other suitable material connected to a hub 12 having a central collar portion keyed to a drive shaft 14 extending upward therefrom through suitable bearings. The drive shaft preferably extends vertically and the disc 11 rotates in a horizontal plane. The hub 12 has a relatively small diameter as compared with that of the disc 11 and is separated from the outer portion of the disc by a vertically extending annular flange 15.

A housing is arranged about the disc and comprises a bottom 16, a sectional top 17, and a peripheral wall 18 connecting the top and bottom. The cover 17 preferably has a fixed central section 17a with side sections removably connected thereto to form a complete cover. Brackets 1 and 2 at opposite sides of the housing support the machine.

To permit the entrance of the materials, such as gypsum plaster, water, and foam, openings are provided in the cover. The water may be supplied through the water inlet 19, the gypsum plaster through the opening 20, and the foam through the opening 21. Thus the various materials are supplied to the mixer relatively close to the hub and at some distance from the periphery of the mixer.

For the purpose of thoroughly mixing the slurry, the cover 17 is provided with a series of downwardly projecting, adjustable pins 22 while the rotor has a number of pins 23 extending upwardly therefrom substantially to the lower surface of the cover 17. The pins 23 are so positioned that as the disc 11 is rotated they will pass between the pins 22 extending downwardly from the cover 17.

In the mixer illustrated, three rings 24 are secured in spaced relation on the disc 11 adjacent the outer edge thereof. These rings extend upwardly preferably less than one-half the distance between the top of the disc 11 and the bottom of the cover 17. Rings 25 mounted on the fixed cover 17 project downwardly between the lower rings 24. The stationary rings 25 are made discontinuous to provide offset discharge openings 26 and 27 between their respective ends, as shown particularly in Fig. 1.

The disc in the arrangement illustrated rotates in the direction of the arrow of Fig. 1, so that the material is thoroughly mixed by the time it reaches the wall 18 for discharge therefrom. As the wall is subjected to considerable wear it is preferably provided with replaceable wearing rings 18a of any suitable, wear-resistant material.

Figures 4, 5, 6, 7, 8:
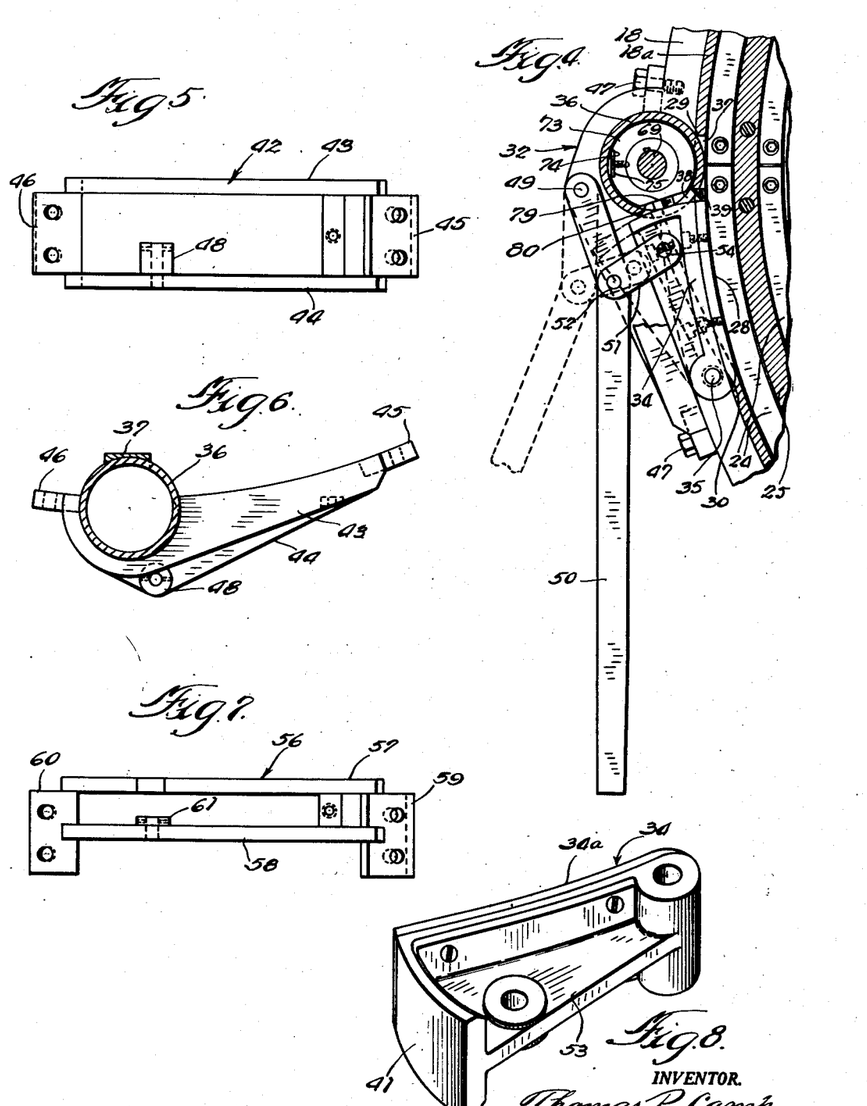
Fig. 4 is a horizontal cross-sectional view of a gate construction taken along the lines 4—4 of Fig. 3.
Fig. 5 is a side elevational view of a bracket employed for mounting a discharge gate construction on the mixing machine.
Fig. 6 is a plan view partially in section showing a bracket positioned about a discharge spout.
Fig. 7 is a side elevational view of a discharge bracket employed with a discharge construction having a narrow gate and discharge opening.
Fig. 8 is a perspective view of a discharge gate.
Figures 9, 10:
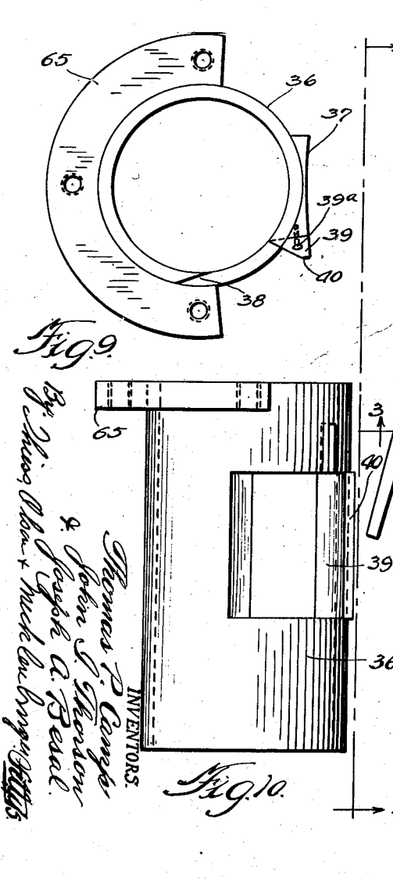
Fig. 9 is a top plan view of a discharge spout which may be employed in the present construction.
Fig. 10 is a side elevational view of the spout shown in Fig. 9.

The mixer illustrated is designed to supply slurry to one, two or three streams of board. Accordingly, three discharge ports 28 are provided in the vertical wall 18 of the housing, in each of which a self-cleaning gate construction is arranged. As shown in Fig. 4, the discharge port extends through both the vertical wall 18 and the replaceable wearing ring 18a fixedly secured thereto. The port is of considerable length and preferably extends from the portion of the wearing ring 18a marked 29 to the opposed end 30 thereof, although as hereinafter pointed out, it may be commensurate in length with the gate used.

Of the three discharge gate constructions designated 31, 32, and 33 the second two are identical while the first gate construction 31 is similar thereto but preferably has a narrower gate and discharge opening 28. The gates can all be of the same dimension, if desired.

Considering first a gate construction such as those marked 32 and 33 and shown in Figs. 1, 2, 3, and 4, a gate member 34 (Fig. 8) shaped as a segment of the peripheral wall 18 and having a width substantially equal to the vertical width of the discharge port 28 is pivoted adjacent the trailing edge 30 of the port 28 (Fig. 4) about a vertical pivot 35. The end 30 of the port 28 is rounded to closely receive the rounded end of the gate. In this arrangement the gate 34 may be positioned as a segment of the wall 18, and, like the wall 18, is provided with a wear-resistant surface 34a. The pivot 35 extends upwardly from the bottom 16 of the housing and, if desired, may extend into the cover 17.

As shown in Fig. 4, the horizontal length of the gate may be less than the distance between the ends 29 and 30 of the port 28, so that the leading portion of the port 28, as determined by the direction of rotation of the disc, is beyond the free end of the gate 34. Positioned over this portion of the discharge port 28 there is a vertically arranged spout 36 which may be formed of steel tubing, having a backing 37 of some wear-resisting material, such as stellite, secured thereto by welding or other means. The spout and backing are positioned in the end of the port beyond 73 having a cut-out portion 74 in the periphery thereof for fixedly receiving the upper end of a scraper member 75. The scraper member 75 preferably extends longitudinally of the tube from the disc 73 to below the lower end of the spout 36. The forward longitudinal edge of the scraper is tapered to provide a scraping edge as shown in Fig. 4. Accordingly, when the scraper disc 73 is rotated the scraper will continually scrape the inner sides of the spout 36 and also the inner sides of the upper end of a conduit 76 which is attached by a clamp 77 to the lower end of the spout 36. Each of the conduits, which may be of rubber, directs the slurry from the spout to a board-forming machine or other location.

The scraper-supporting member 73 may be of various shapes. The upper portion located above the top of the spout opening 38 is preferably cylindrical, with an outer diameter slightly less than the inner diameter of the spout.

Figure 3:
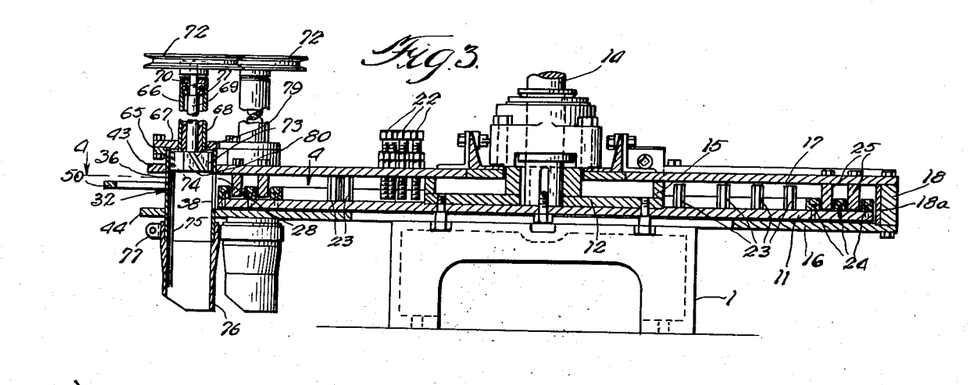
Fig. 3 is a vertical cross-sectional view taken along the line 3—3 of Fig. 1.
Figure 11:
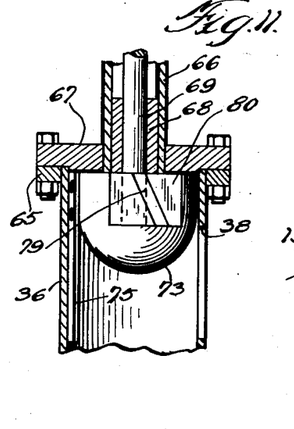
Fig. 11 is an enlarged cross-sectional view of a vertical discharge spout with a modified form of rotating scraper-supporting member therein.

The scraper-supporting member illustrated in Fig. 3 is disc-shaped, with the lower face flat and substantially aligned with the upper edge of the spout opening 38. Another general type of scraper-supporting member that may be employed has the central portion of its lower surface extending below the periphery. For example, it may be convex as illustrated in Fig. 11, or even conical. In any of these forms, the lower surface will be swept and kept substantially clean by the stream of material entering the spout opening.

It has also been found advisable to provide means for maintaining the space between the spout 36 and the periphery of the scraper-supporting member 73 clean and free of the material being handled. Otherwise the slurry or other material would enter this space and prevent rotation of the spout-cleaning means. For this purpose a segment may be cut off from the periphery of the scraper-supporting member 73 as illustrated particularly in Figs. 4 and 11, and a scraper 79 secured by welding or other suitable means to the resulting surface 80 of the rotating member. The surface 80 may be flat and the scraper 79 is arranged thereon substantially diagonally with the upper end in advance of the lower end, as determined by the direction of rotation of the member 73. While the shape of the scraper may be varied, the outer face thereof preferably conforms to the curvature of the inner face of the spout and is positioned practically thereagainst. As the scraper 79 is secured to the surface 80, there is a passage or channel in front of the scraper down which the material scraped from the inner edge of the spout will pass. During rotation the scraper 79 will remove any material collecting between the member 73 and the inner face of the spout adjacent thereto and force it downwardly through the spout 36.

Due to the arrangement of the scrapers 75 and 79 and the sweeping action of the material over the lower face of the scraper-supporting member 73, the spout will be kept clean and free of any harmful accumulation of material for indefinite periods of time.

Figs. 11, 12, 13, and 14 show a modified form of spout construction in which the substantially vertical spout 36 is dispensed with and the conduit 76 is shaped and positioned to receive directly in one end the material discharged through the mixer port 28. The conduit thus serves as a spout.

Figure 12:
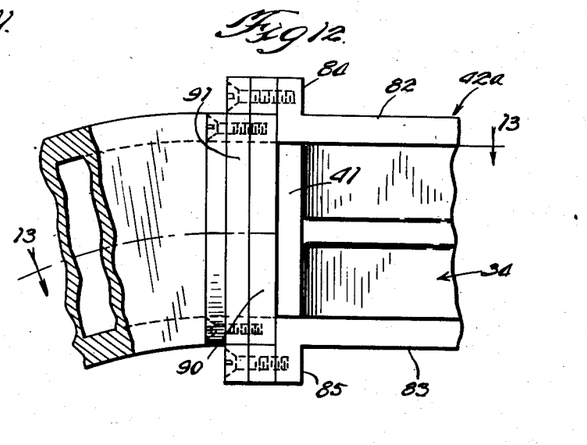
Fig. 12 is a side elevational view of a modified discharge construction in which the end of the conduit for carrying material from the mixer acts as a spout and is positioned to receive the material in one end directly from the mixer port and gate.
Figures 13, 14:
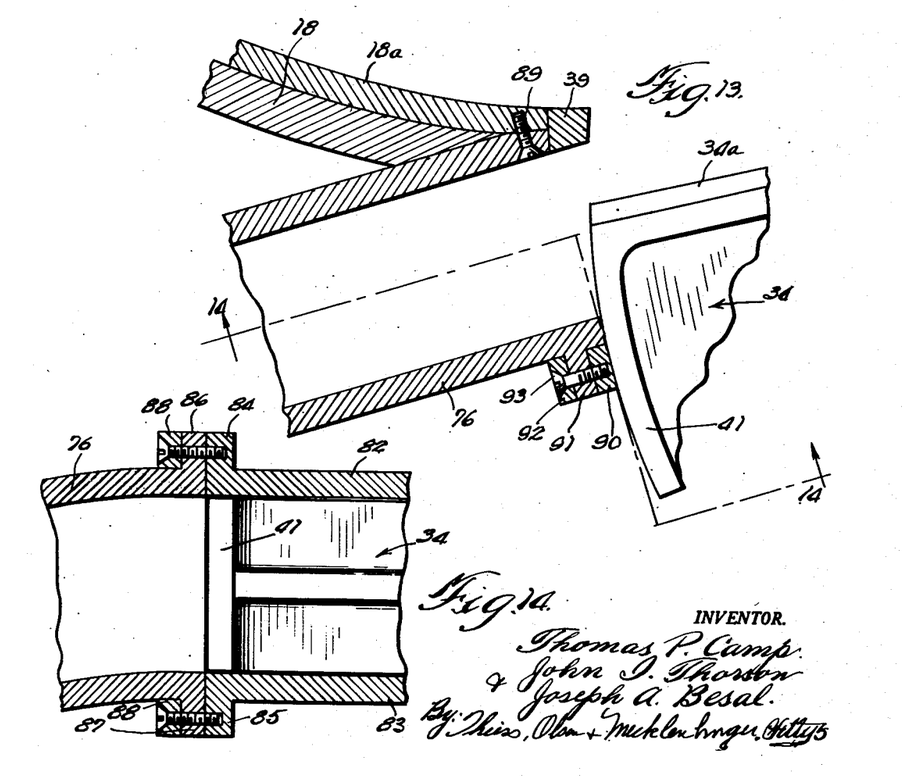
Fig. 13 is a horizontal cross-sectional view taken on the line 13—13 of Fig. 12.
Fig. 14 is a vertical cross-sectional view taken on the line 14—14 of Fig. 13.

In this modification, the gate 34 is pivotally mounted at one end in a supporting bracket, in the same manner as previously described in connection with the bracket 42 and pivot 35. Referring to Fig. 12 the bracket 42a is provided with an upper plate 82 and a lower plate 83. The ends of the plates 82 and 83 opposite to those in which the gate 34 is pivoted, terminate over the free end of the gate 34 and are provided with upwardly and downwardly extending flanges 84 and 85, respectively. The hardened edge member 39 is positioned to be abutted by the free end of the gate 34 when in closed position and is removably fastened by any suitable means to the wearing ring 18a of the mixer wall 18, as shown in Fig. 13.

The end of the conduit 76, which is preferably made of flexible rubber, is molded into a generally rectangular shape to abut the periphery of the mixer and the flanges 84 and 85 at the ends of plates 82 and 83. The receiving end of the conduit 76 may be provided with top and bottom flanges 86 and 87 for being secured to the bracket flanges 84 and 85. Clamping strips 88 are positioned on the opposite sides of the flanges 86 and 87 and screws or other securing means are inserted through the strips 88, flanges 86 and 87, and are then threaded into the flanges 84 and 85 of the gate bracket 42a. The inner side of the conduit 76 may be secured to the mixer by screws 89. The periphery of the mixer is shaped to permit the adjacent side of the conduit 76 to fit thereagainst.

For the purpose of securing the outer side of the conduit 76 a connecting member 90 is secured over the outer ends of the plates 82 and 83 and connects them together. The outer side of the conduit is provided with a flange 91 (Fig. 13) which abuts the connecting member 90. A clamping strip 92 fits over the opposite face of the flange 91 to clamp it between the connecting member 90 and the clamping strip 92. Suitable screws 93 may be employed for maintaining the clamping ring 92 in clamping position with respect to the flange 90.

The construction just hereinabove provided is suitable under certain conditions, while in others the self-cleaning spout construction such as shown in Figs. 1–11 must be employed. When the gate 34 is moved to open position the material being handled passes through the mixer port 28 and directly into the end of the tube 76. As the conduit 76 is preferably made of flexible rubber or similar material it will be vibrated by the mixer and building up of material in the conduit will often be prevented thereby.

With a construction as hereinabove described the discharge of the material from the mixer may be easily and accurately controlled. As the discharge gate construction 31 is the first one reached by the material in the mixer, the outward pressure of the material at that point is greater than at the other gate constructions, so that, if desired, a smaller discharge opening in the housing wall and a smaller receiving opening in the spout may be used to supply an adequate amount of material to the board machine or other equipment. However, the gates may be accurately adjusted to control the rate of discharge by moving their respective handles whether all the openings are the same size or not.

The mixer may be run for extended periods of time without any substantial build-up on the spout or gate constructions. When the spout 36 is used, the constantly rotating scrapers maintain the spout and the upper end of the conduit connected thereto clean at all times. Movement the free end of the gate 34 with the backing 37 acting as a continuation of the wearing ring 18a of the vertical wall 18 of the housing.

The spout 36 has an opening 38 of substantially the same vertical width as that of the discharge port 28 and is so positioned that when the gate 34 is pivoted outwardly the material in the mixer will be discharged through the opening 38 into the spout 36, being guided to some extent by the gate. As the inner vertical side of the opening 38 is subjected to great wear due to impingement thereagainst of the material being discharged from the mixer, a special hardened edge member 39 is mounted on the spout 36 and the backing 37, as appears particularly in Figs. 4 and 9. While the hardened edge member 39 may be integral with or welded to the backing 37, it is preferably detachably secured by suitable means. One way of accomplishing this is by means of screws 39a, which extend from one or both ends of the edge member 39 diagonally into the backing 37.

The edge 39, which may be made of stellite or any other suitable wear-resisting material, is provided with a relatively flat edge portion 40 facing the stream of material being discharged through the discharge port 28 of the mixer. With this shape, the material being discharged may build up on the flat edge 40 and act to protect this surface.

When the spout 36 with the backing 37 and hardened edge member 39 are positioned in the discharge port 28 adjacent the end 29 thereof and the gate is in inner closed position, the free end of the gate abuts the edge 39 and the discharge port 28 is completely closed. In this position, any build-up on the inner face of the gate 34 will be removed by the action of the rotor in the mixer. Instead of having the backing member 37 attached to the spout 36, it may be formed integrally with the wearing ring 18a and receive the spout in the arcuate indented portion thereof.

The free end of the gate 34 is provided with an arcuate portion 41 projecting rearwardly or outwardly from the mixer. The curvature of the outwardly extending portion 41 is such that when the gate 34 is in closed position the arcuate portion 41 extends between the hardened edge member 39 and the opposite vertical side of the opening in the spout to close the same. The curvature of the arc may be substantially that of a circle having the pivot 35 as a center. When the gate is moved to closed position, the arcuate portion 41 is cleaned of any build-up thereon by scraping against the spout 36, and any build-up on the vertical edges of the spout opening is also removed.

Each of the spouts 36 with the full width openings 38 therein, forming part of the gate constructions 32 and 33, is secured to the mixer by a discharge bracket 42 having an upper plate 43, a lower, preferably parallel, plate 44, and end mounting flanges 45 and 46. The inner edges of the plates 43 and 44 and the inner faces of the flanges 45 and 46 are made arcuate as shown in Fig. 6, so as to abut the periphery of the vertical wall 18 of the housing. Substantially semi-circular cut-out portions are provided in the inner edges of the plates 43 and 44 to receive therein the spout 36, the cut-out portions being of such size that the sides thereof extend more than halfway around the spout. Thus, when the spout 36 and backing 37 are positioned in the leading end of a discharge port 28, the bracket 42 thereover will abut the outer periphery of the wall 18. The flanges 45 and 46 are provided with openings for screws 47 which removably secure the bracket 42 to the periphery of the mixer housing.

When the bracket 42 is properly positioned, the opposed faces of the upper and lower plates are substantially aligned with the top and bottom edges of the discharge ports 28 and any build-up on said opposed faces or port edges will be removed by closing movement of the cooperating discharge gate 34. The brackets may hold the spouts in place by friction or it may be desirable to secure the spouts to the brackets by any suitable means.

The lower plate 44 of the discharge bracket 42 has a bearing portion 48 in which is journalled a pivot pin 49 of a lever 50. A pair of links 51 is connected to the opposite sides of the lever 50 by a pivit 52 and to the opposite sides of the central flange 53 of the gate 34 by a pivot 54. Easy and accurate adjustment of the gate may be made simply by moving the lever 50 about its pivot 49.

The discharge gate construction designated as 31 is the first one reached by the mixed material ready for discharge as it is carried around by the rotatable disc. It is similar to the other discharge gate constructions 32 and 33 except that the discharge port, the spout opening, the gate, and the bracket therefor, are only partially as wide as in the other gate constructions. The discharge port of the housing wall 18 only extends downwardly from the cover 17 about one-half way to the base 16 and the gate 55 therefor is preferably the same length as the gates 34 but only as wide as its associated discharge port. However, the gate 55 is mounted similarly to the gates 34 to swing about a pivot 35a at its trailing end.

The vertical width of the receiving opening in the discharge spout 36 employed in gate construction 31 is of the same vertical width as the discharge port in the wall 18 with which it is associated. As the openings and gate are relatively narrow, the discharge bracket 56 (Fig. 7) used therewith has the upper and lower plates 57 and 58, supported between the end securing flanges 59 and 60, spaced a distance apart substantially equal to the width of the narrow gate. A bearing portion 61 is provided on the lower bracket plate 58 for receiving the pivot pin 62 of the operating lever 63. The lever 63 is connected to the narrow gate 55 by a link 64 which is the same as the links 51.

Secured to the upper end of the spout 36 is a semi-circular collar 65 on which is mounted a drive sleeve 66 having a semi-circular collar 67 at the lower end for being bolted or otherwise secured to the collar 65. Positioned in the lower end of the drive sleeve 66 is a bushing 68 through which extends a drive shaft 69. The upper end of the drive shaft 69 is of reduced diameter and extends upwardly through a seal cap 70 positioned in the upper end of the drive sleeve. Suitable bearings 71 are preferably arranged about the reduced end of the drive shaft below the seal cap 70. The lower race of the bearing 71 is shown as being supported by the sleeve 66 and the upper race as supporting a nut adjustably positioned on the reduced end of the drive shaft 69. A pulley 72 is fixed to the outer end of the drive shaft for being connected to any suitable source of power. The pulley is intended to be driven at speeds up to 500 R. P. M. or more.

At the lower end of the drive shaft 69 which extends into the upper end of the spout 36 there is fixedly secured a scraper-supporting member of the gate to closed position removes accumulated material from about the mixer ports and spout openings and from the discharge brackets 42 as well as from the free end of the gate. This action may be repeated as often as desirable. In addition, various parts such as the inner face of the gate and the lower surface of the scraper-supporting member are continuously kept clean by the material sweeping thereover.

The discharge gate construction may be readily removed from the mixer through the removal of the discharge brackets, although the wearing edge of hardened material at the inner side of the spout opening makes it possible to use the discharge gate construction for long periods of time, despite the abrasive action of the material constantly impinging thereagainst.

While we have shown a particular embodiment of our invention, it will be understood that we do not wish to be limited thereto since many modifications may be made, and we therefore contemplate, by the appended claims, to cover any such modifications as fall within the true spirit and scope of our invention.

We claim:

1. Discharge control means for a rotary mixing device having a disc mounted for rotation about a substantially vertical axis and a peripheral wall about said disc having a discharge port therein, comprising a control gate in said port adjustable to any opening between fully opened and completely closed positions, a tubular spout positioned outwardly of said disc having an opening arranged to communicate with said port when the gate is open, and an elongated scraper extending substantially longitudinally of said spout mounted for rotation adjacent the walls thereof, and driving means for effecting rapid rotation of said scraper to scrape from said spout any material tending to adhere thereto.

2. A spout construction for a rotary mixing device having a disc mounted for rotation about a substantially vertical axis, a peripheral wall about said disc having a discharge port therein and means for controlling the discharge of material through said port, comprising a spout positioned adjacent said port having an opening therein arranged to receive material discharged through said port, an elongated scraper extending longitudinally of said spout mounted for rotation adjacent the inner walls thereof, said scraper having a relatively small cross-sectional area compared to the cross-sectional area of said spout to permit substantially free flow of material through said spout, and driving means for effecting rotation of said scraper for scraping from the walls of said spout material tending to adhere thereto.

3. A spout construction for a rotary mixing device having a disc mounted for rotation about a substantially vertical axis, a peripheral wall about said disc having a discharge port therein and means for controlling the discharge of material through said port, comprising a substantially vertically extending tubular spout positioned adjacent said port having an opening in one side thereof arranged to receive material discharged through said port, a scraper-supporting member having a diameter slightly smaller than the inner diameter of said spout mounted for rotation in said spout above the opening therein, an elongated scraper having one end connected to said rotary member and extending downwardly in said spout adjacent the walls thereof, said scraper having a relatively small cross-sectional area compared to the cross-sectional area of said spout to permit substantially free flow of material through said spout, and means for rotating said scraper supporting member for scraping from the walls of said spout material tending to adhere thereto.

4. A construction as in claim 3 in which the rotary member is provided with a peripheral scraper for removing any accumulation of material between the periphery of said member and the surrounding walls of said spout during rotation of the member.

5. A construction as in claim 3 in which the rotary member is provided with a substantially diagonally arranged peripheral scraper for removing any accumulation of material between the periphery of said member and the surrounding walls of said spout during rotation of the member.

6. A construction as in claim 3 in which the rotary member is provided with a substantially diagonally arranged peripheral scraper projecting slightly outwardly of the periphery of said member for removing any accumulation of material between the periphery of said member and the surrounding walls of said spout during rotation of the member.

7. A construction as in claim 3 in which the rotary member is provided with a substantially diagonally arranged peripheral scraper projecting slightly outwardly of the periphery of said member and having its upper end in advance of its lower end for removing and directing down said spout any accumulation of material between the periphery of said member and the surrounding walls of said spout during rotation of the member.

8. A construction as in claim 3 in which the rotary member is provided with a substantially diagonally arranged peripheral scraper projecting slightly outwardly of the periphery of said member and having its upper end in advance of its lower end, said member having a cut-out portion adjacent the forward side of said scraper to permit the passage of material scraped from said spout to be discharged below the member.

9. A construction as in claim 3 in which the rotary member has a segment cut out from the periphery thereof, a scraper positioned in said cut-out portion and arranged to extend substantially the axial width of the periphery of said member with the upper end in advance of its lower end, the exterior surface of said scraper projecting slightly outwardly of the periphery of said member and being curved to conform substantially to the curvature of the interior face of said spout, whereby said scraper will remove and direct down said spout any accumulation of material between the periphery of said member and the surrounding walls of said spout during the rotation of the member.

10. A spout construction for a rotary mixing device having a disc mounted for rotation about a substantially vertical axis, a peripheral wall about said disc having a discharge port therein and means for controlling the discharge of material through said port, comprising a substantially vertically extending tubular spout positioned adjacent said port having an opening in one side thereof arranged to receive material discharged through said port, a scraper disc mounted for rotation in said spout above the opening therein with the lower face of said disc substantially horizontally aligned with the upper edge of said opening, so that the material passing through said opening sweeps the lower face of said disc, an elongated substantially straight scraper having one end connected to said scraper disc and extending downwardly longitudinally of said spout adjacent the walls thereof, and means for rotating said scraper disc for scraping from the walls of said spout material tending to adhere thereto.

11. A spout construction for a rotary mixing device having a disc mounted for rotation about a substantially vertical axis, a peripheral wall about said disc having a discharge port therein and means for controlling the discharge of material through said port, comprising a substantially vertically extending tubular spout having an opening in one side thereof arranged to receive material discharged through said port, a scraper-supporting member having a diameter slightly smaller than the inner diameter of said spout mounted for rotation in said spout largely above the opening therein, said rotary member having the central portion of its lower surface projecting below the periphery thereof and positioned in the path of material entering said spout for being cleaned thereby, scraping means on said rotary member for scraping the inner wall of said spout, said scraper having a relatively small cross-sectional area compared to the cross-sectional area of said spout to permit substantially free flow of material through said spout, and means for rotating said member.

12. A spout construction for a rotary mixing device having a disc mounted for rotation about a substantially vertical axis, a peripheral wall about said disc having a discharge port therein and means for controlling the discharge of material through said port, comprising a substantially vertically extending tubular spout having an opening in one side thereof arranged to receive material discharged through said port, a scraper-supporting member having a diameter slightly smaller than the inner diameter of said spout mounted for rotation in said spout largely above the opening therein, said rotary member having its lower surface substantially convex and positioned in the path of material entering said spout for being cleaned thereby, scraping means on said rotary member for scraping the inner wall of said spout, said scraper having a relatively small cross-sectional area compared to the cross-sectional area of said spout to permit substantially free flow of material through said spout, and means for rotating said member.

13. Discharge control means for a rotary mixing device having a disc mounted for rotation about a substantially vertical axis and a peripheral wall about said disc having a discharge port therein, comprising a control gate in said port pivoted at one end about a substantially vertical pivot and adjustable outwardly from said port to any opening between fully opened and completely closed positions, a spout adjacent the outer side of said disc at the free end of said gate having an opening arranged to communicate with said port when the gate is open, and a bracket shaped to fit about said spout and in abutment with said wall for removably securing said spout in place.

14. Discharge control means for a rotary mixing device having a disc mounted for rotation about a substantially vertical axis and a peripheral wall about said disc having a discharge port therein, comprising a control gate in said port pivoted at one end about a substantially vertical pivot and adjustable outwardly from said port to any position between fully opened and completely closed positions, a spout adjacent the outer side of said disc at the free end of said gate having an opening arranged to communicate with said port when the gate is open, a bracket shaped to fit about said spout and in abutment with said wall for removably securing said spout in place, and a lever and link construction mounted on said bracket for controlling the movement of said gate.

15. Discharge control means for a rotary mixing device having a disc mounted for rotation about a substantially vertical axis and a peripheral wall about said disc having a discharge port therein, comprising a control gate for fitting in said port pivoted at one end about a substantially vertical pivot and adjustable outwardly from said port to any position between fully opened and completely closed positions, and a spout adjacent the outer side of said disc at the free end of said gate having an opening arranged to communicate with said port when the gate is open, said gate having an outwardly extending substantially arcuate barrier at its free end arranged to fit over the opening in said spout when said gate is in closed position.

16. Discharge control means for a rotary mixing device having a disc mounted for rotation about a substantially vertical axis and a peripheral wall about said disc having a discharge port therein, comprising a control gate for fitting in said port pivoted at one end about a substantially vertical pivot and adjustable to any position between fully open and completely closed positions, and a spout adjacent the outer side of said disc at the free end of said gate having an opening arranged to receive material discharged from said port when the gate is open, the side of said opening adjacent said disc having a replaceable wear-resistant portion with a blunt surface in the path of the discharged material, said blunt surface being positioned adjacent the path of the outer free end of said gate for being cleaned by the free end of said gate when it is moved to closed position.

17. An adjustable gate and spout construction for a rotary mixing device having a disc mounted for rotation about a substantially vertical axis and a peripheral wall about said disc having a discharge port therein, comprising a control gate for fitting in said port pivoted at one end and adjustable to any position between fully open and completely closed positions, and a spout adjacent the outer side of said disc at the free end of said gate having an opening arranged to receive material discharged from said port when the gate is opened, said spout opening having opposite edges substantially equidistant from said pivot, and said gate having means adjacent the free end thereof positioned to sweep across said opposite edges of said spout opening upon movement of said gate to remove from said edges material accumulated thereon.

18. An adjustable gate and spout construction for a rotary mixing device having a disc mounted for rotation about a substantially vertical axis and a peripheral wall about said disc having a discharge port therein, comprising a control gate for fitting in said port pivoted at one end and adjustable to any position between fully open and completely closed positions, and a spout adjacent the outer side of said disc at the free end of said gate having an opening arranged to receive material discharged from said port when the gate is open, said spout opening having opposite edges substantially equidistant from said pivot, and said gate, spout and port being relatively so positioned and arranged that as said gate moves from open to closed position the free end of said gate will brush across said opposite edges of said spout opening and material on said edges and the sides of said port will be removed by said gate.

19. An adjustable gate and spout construction for a rotary mixing device having a disc mounted for rotation about a substantially vertical axis and a peripheral wall about said disc having a discharge port therein, comprising a control gate for fitting in said port pivoted at one end about a substantially vertical pivot and adjustable to any position between fully opened and completely closed positions, a substantially vertically extending tubular spout adjacent the outer side of said disc at the free end of said gate having an opening arranged to receive material discharged from said port when the gate is open, an elongated scraper extending downwardly in said spout adjacent the walls thereof, and means for rotating said scraper to scrape material tending to adhere to the walls of said spout, said gate, spout and port being relatively so positioned and arranged that as said gate moves from open to closed position the free end of said gate will brush across opposite edges of said spout opening and material on said edges and the sides of said port will be removed by said gate.

20. Discharge control means for a rotary mixing device having a disc mounted for rotation about a substantially vertical axis and a peripheral wall about said disc having a discharge port therein, comprising a control gate for fitting in said port, a bracket on the outer side of said wall adjacent said port, said gate being pivoted at one end on said bracket and movable outwardly from said port, and a spout connected to said bracket having an opening positioned to receive material discharged from said port when the gate is open.

21. Discharge control means for a rotary mixing device having a disc mounted for rotation about a substantially vertical axis and a peripheral wall about said disc having a discharge port therein, comprising a control gate for fitting in said port, a bracket on the outer side of said wall adjacent said port having a pair of spaced substantially parallel members between which said gate is guided, said gate being pivoted at one end on said bracket and movable outwardly from said port, and a spout connected to said bracket having an opening shaped and positioned to receive material discharged from said port when the gate is open.

22. Discharge means for a rotary mixing device having a disc mounted for rotation about a substantially vertical axis and a peripheral wall about said disc having a discharge port therein, comprising a control gate for fitting in said port adjustable to any position between fully closed position with said gate in said port and fully opened position with said gate moved outwardly from said port, and a substantially vertically extending spout adjacent the outer side of said disc at one end of said gate having an opening in one side thereof arranged to communicate with said port when the gate is open.

23. Discharge means for a rotary mixing device having a disc mounted for rotation about a substantially vertical axis and a peripheral wall about said disc having a discharge port therein, comprising a control gate for fitting in said port pivoted at one end about a substantially vertical pivot adjustable to any position between fully closed position with said gate in said port and fully opened position with said gate pivoted outwardly therefrom, and a spout adjacent the outer side of said disc at the free end of said gate having an opening arranged to communicate with said port when the gate is open.

24. Discharge means for a rotary mixing device having a disc mounted for rotation about a substantially vertical axis and a peripheral wall about said disc having a discharge port therein, comprising a control gate for fitting in said port pivoted at one end about a substantially vertical pivot adjustable to any position between fully closed position with said gate in said port and fully opened position with said gate pivoted outwardly therefrom, a spout adjacent the outer side of said disc at the free end of said gate having an opening arranged to communicate with said port when the gate is open, and means for pivoting said gate from its closed position to its open position with the free end thereof outwardly of said spout opening.

25. Discharge means for a rotary mixing device having a disc mounted for rotation about a substantially vertical axis and a peripheral wall about said disc having a discharge port therein, comprising a control gate for fitting in said port pivoted at one end about a substantially vertical pivot adjustable to any position between fully closed position with said gate in said port and fully opened position with said gate pivoted outwardly therefrom, a spout adjacent the outer side of said disc at the free end of said gate having an opening arranged to communicate with said port when the gate is open, and means for pivoting said gate from its closed position to its open position with the free end thereof outwardly of said spout opening, said gate having an outwardly-extending substantially-arcuate barrier arranged to fit over the opening in said spout when said gate is in closed position.

THOMAS P. CAMP.
JOHN I. THORSEN.
JOSEPH A. BESAL.

References Cited in the file of this patent
UNITED STATES PATENTS

| Number | Name | Date |
|---|---|---|
| 428,346 | Mueller | May 20, 1890 |
| 459,758 | Martin | Sept. 22, 1891 |
| 960,081 | Fearon | May 31, 1910 |
| 1,040,642 | Dalton | Oct. 8, 1912 |
| 1,105,209 | Sauchereau | July 28, 1914 |
| 1,131,260 | Nydegger | Mar. 9, 1915 |
| 1,713,886 | Benzon | May 21, 1929 |
| 1,758,200 | Pfeffer | May 13, 1930 |
| 1,907,773 | Fisher | May 9, 1933 |
| 2,253,059 | Camp | Aug. 19, 1941 |
| 2,392,231 | Cooper | Jan. 1, 1946 |